July 16, 1935.    J. M. BOYKOW    2,008,058
APPARATUS FOR DETERMINING THE TRUE HORIZON INDEPENDENTLY OF SIGHT
Filed Oct. 14, 1931    4 Sheets-Sheet 1

Inventor
Johann Maria Boykow,
By Emil Rönnelyche
Attorney

Patented July 16, 1935

2,008,058

UNITED STATES PATENT OFFICE 2,008,058

APPARATUS FOR DETERMINING THE TRUE HORIZON INDEPENDENTLY OF SIGHT

Johann Maria Boykow, Berlin-Lichterfelde, Germany, assignor to Deutsche Luftfahrt- und Handels - Aktien - Gesellschaft, Berlin, Germany, a corporation of Germany Application October 14, 1931, Serial No. 568,835
In Germany October 15, 1930

11 Claims. (Cl. 33—204)

This invention relates to an apparatus for determining, independently of sight, the true horizon of a moving system, and more particularly a directed horizon, with the assistance of a three-gyroscope apparatus.

Apparatus in the form of manually controlled indicating instruments have already been proposed, by means of which the horizon may be ascertained. It has also been proposed to employ apparatus which automatically determine a true directed horizon with the assistance of three gyroscopes.

The apparatus of the first type has the disadvantage that these instruments necessitate a manual control, and in consequence thereof are dependent, as regards their exactitude, on the ingenuity of the person using them.

The apparatus of the second type are not capable of continued use over an appreciable length of time, for example on board a ship during a trip of any considerable duration, since the rotation of the earth acting on the gyroscopes cannot be compensated for with any degree of accuracy so that after a certain number of hours—owing to ignorance of the degree of error in the compensation performed—inaccuracies of an excessive nature are introduced, in respect of which accurate means for rectifying the same are not available. Beyond this, these apparatus call for continuous operation on the part of the gyroscopes immediately from the commencement of the trip, as it is possible therewith to maintain only the particular horizon which was set when the system was at rest, and not to determine the horizon at any desired time merely by reason of a re-starting operation.

It is the primary object of this invention to overcome the disadvantages referred to.

An additional object is to provide for the use, in conjunction with existing gyroscopic arrangements, of an auxiliary apparatus which may be employed therewith for the purpose of automatic control and correction.

The invention is based on the fact that the total precession of a gyroscope supported above its center of gravity is caused by the rotation of the earth and the acceleration of the system. The system is the entire body on which the apparatus is erected, or to which it is attached, for example a ship. The precession, however, is influenced by the friction of the bearings and other interior resistances adapted to decrease the true rate of precession. Another condition causing precession of the gyroscope is an inclination of the system.

The apparatus according to the invention resides in the fact that, in connection with a three-gyroscope apparatus, (1) all angles of precession of the horizon gyroscopes are algebraically added in some suitable form;

(The relation between the total of the precessions of a horizon gyroscope and the rate of movement of the object consists in the fact that the precession of the gyro is proportional to that component of the acceleration of the support of the gyro which is parallel to the spin axis of the gyro. Therefore, the integral of the precessions of the gyro is proportionate to the integral of the accelerations of the object. Now, the integral of the precessions is the algebraic total of the precessional angles, and the integral of the accelerations is the speed of the object.)

(2) the particular total is shown as a certain distance on a rate of movement scale conforming to the total precession, with consideration to the angular position of the azimuth gyroscope in relation to the line of the keel or the universal axes;

(Each of the two horizon gyros, which are arranged with spin axes rectangular to one another, is therefore adapted to allow for measurements of speed in the direction of one component. The geometrical total will be a measure of the speed in the true direction of speed.)

(3) the actual rate of movement of the system as determined in any other fashion (speedometer) is also shown as a certain distance in the same proportion to speed, and (4) the two distances are compared.

The difference furnishes a scale as regards the error in compensation for rotation of the earth, including both the resistances in the apparatus as well as the inclined position of the system. From this there may be calculated the inclined position, i. e., the true horizon.

This, however, is somewhat complicated. On the other hand since the difference between the apparent and true rate of movement only remains constant in the case of chronologically performed measurements when the three-gyroscope apparatus is in the horizontal position, the position of the apparatus is, according to the invention, corrected for such time following the first measurement until the difference in the distances remains constant in the case of at least two consecutive measurements (for example, 5 minutes). Naturally, this latter measure may be dispensed with if, for example by means of correspondingly prepared tables, the necessary rectifying angle for the various differences has been definitely determined beforehand. Correction in the position of the apparatus, however, is particularly desirable if the same is produced, in addition to action exerted on the axes of precession of the horizontal gyroscopes, by action exerted on the axis of precession of the azimuth gyroscope, and this feature also constitutes part of the invention. If this is carried out, the system, in the case of correct position, is identified as regards the north direction. On the lines of the new method the apparatus may at the same time also be employed as a compass.

The method in question may be employed without imparting to the gyroscopes particular compensation against rotation of the earth. A preliminary compensation of this nature, however, is to be recommended if it is not desired to obtain excessive differences in value.

The apparatus for performing the method concerned comprises in substance an apparatus having three gyroscopes, the axes of precession of which may be acted upon by regulable turning moments, with means for representing the algebraical total of precession of the horizontal gyroscopes as a directed distance, and for comparing this distance with a rate of progression of the support, also as a distance, determined in another manner.

The invention is illustrated by way of example in a form of embodiment in the accompanying drawings, wherein.

The three gyroscopes 11, 12 and 13 are located with vertical and sensitive superimposed axes in the main frame 14. The gyroscope 13 is arranged as an azimuth gyroscope with horizontal axis of precession, while the two remaining gyroscopes 11 and 12 possess vertical axes of precession and horizontal spin axes disposed at right angles to each other (the gyro 12 may have a horizontal axis of precession instead of a vertical axis of precession and a vertical impulse axis instead of a horizontal impulse axis). If the apparatus is to be employed simultaneously as a compass, the gyroscope indicating the north direction or the gyroscope, the spin axis of which is directed north-south (in the example shown, the gyroscope 11) is required to possess horizontal spin and vertical precession axes. All of the gyroscopes possess in addition to their freedom of rotation only a freedom of precession about one axis.

The gyroscopes 11, 12 and 13 are supported in the main frame in single frames 15, 16 and 17. The frame 14 is secured in the universal rings 18, 19 with the center of gravity below the point of intersection of the axes 21, 22, and is rotatable about the vertical axis 20. The whole apparatus is connected with the moving system (for example, an aircraft or a ship) by the members 23.

The two gyroscopes 11 and 12 which indicate the horizon are identical in construction, suspension and equipment, with the single exception that, as stated above, the horizontal axes of spin are disposed at right angles to each other, and preferably at least one of them (for example 12), which is directed east-west, possesses an arrangement of the type known, for instance in U. S. Patent No 1,545,479, for compensating for the rotation of the earth. It will therefore suffice to describe the arrangement of the gyroscope 11. The single frame 15 carrying the gyroscope 11 (Fig. 2) is mounted in oscillatory fashion above the center of gravity in the horizontal bearings 24 in the frame 14. At the projection 15' the same is connected in desired manner, for example by means of a spring 152, with the frame 14, or it possesses other means resiliently urging it into the zero position. The gyroscope casing may rotate in the vertical bearings 25, 26 and spin about axis 27.

The vertical trunnion 28 of the gyroscope 11 is provided at the top with a contact arm 29 having a contact, which is capable of moving over contacts 30' on the freely rotatable sector 30 coaxial with the axis 28. The teeth of the sector are engaged by the pinion 31 of the reversing motor 32 secured to the frame 15, and move the same together with its contacts following up the position of the arm 29.

Figure 2:
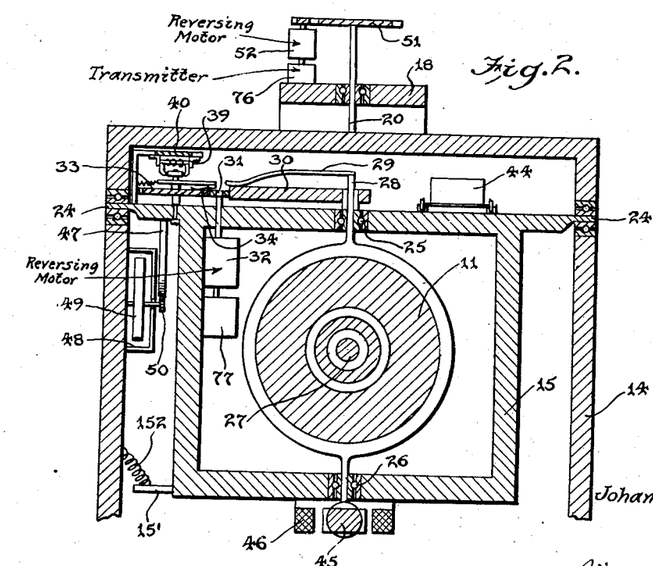
Fig. 2 is a sectional view of a part of the frame showing a gyroscope.
Figure 3:
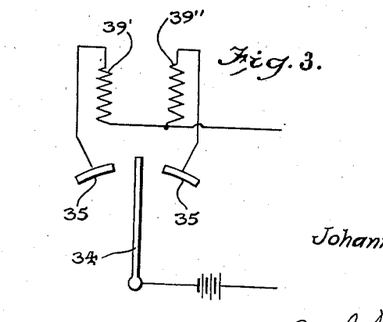
Fig. 3 is a wiring diagram of the magnets of Figs. 5 and 6.
Figure 5:
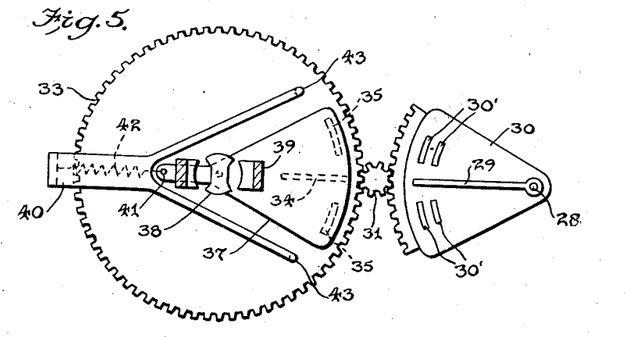
Figs. 5 and 6 are sectional views illustrating details.
Figure 6:
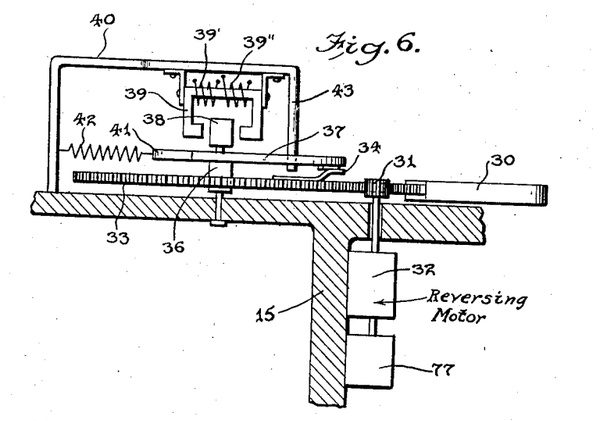

The pinion 31 in turn engages with the gear 33, with which there is connected a contact arm 34 (Figs. 2, 5 and 6). The latter, by rotation through a small dead angle—for example, 6° on each side—moves against one of the contacts 35 on the sector 37, which is freely rotatable about the axis 36 of the gear 33. The sector 37 carries the armature 38 between the poles of an electro-magnet 39, which is secured by a yoke 40 to the frame 15. The same also possesses an arm 41 having the tension spring 42 engaging with the yoke 40. The movement of the sector 37 is limited by stops 43 which are secured to the yoke 40. The part 37 is normally held in its intermediate position by the spring 42 which is secured at one end to the yoke 40. However, if the contact 34 is rotated by the motor 32 on one or the other of the contacts 35, one of the coils 39' or 39" of the electro-magnet 39 (Figs. 3 and 6) will then be energized due to contacts 34 and 35, whereby the armature 38 is so turned that its poles will be opposite to the poles of electro-magnet 39. As the section 37 is secured on the axle of the armature 38, this sector will be turned against the action of the spring 42. The operation of this "spring contact" is such that the electric rotary magnet 38 and 39 will always rotate the sector 37 in an opposite or opposed direction relative to the rotary movement of the contact 34 by the motor 32. For example, if the contact 34 contacts with the right-hand contact 35 (Fig. 3), then the coil 39" will be energized, so that the armature 38 will rotate the sector 37 with the contacts 35 counter-clockwise (Fig. 5) for a definite amount to the, or limited by the, stop 43. This provides for a quicker and more reliable contact closure between 34 and 35. The length of the contact bars 35, on the one hand, and the distance between stops 43, on the other hand, are so chosen that at the moment the contact 34 arrives again at its intermediate position it will separate itself from the respective segment 35. Contact between 34 and 35 takes place only when the contact 34 has traversed a definite angle, for example, 6° from its intermediate position. Contact between 34 and 35 will last until the contact 34 has arrived at its intermediate position. For instance, when the contact 34 is moved to the right for 6° (Fig. 3), the segment 37, due to the energization of the coil 39", will move upwardly 6° (Fig. 5). On the contrary, when the contact 34 is moved to the left for 6° (Fig. 3), the coil 39', which is wound contrary to the winding of coil 39'', will be energized and the segment 37 will move downwardly (Fig. 5) for 6°. Therefore, the contacts 34 and 35 will just be closed when the gyroscope 11 (Fig. 2) has reached a definite precession amplitude, and they will remain closed until the precession amplitude of the gyroscope has been nullified.

The latter is carried out by means of a poise-weight 44 (Fig. 2), which is mounted on the frame 15 of the gyroscope 11 for shifting in a direction at right angles to the axis of the bearings 24. The shifting of the weight 44 from its intermediate position is carried out, as will be more fully described in connection with Fig. 4, by two electro-magnets 44' and 44'', which are in circuit with the contacts 34 and 35 and the weight 44, relative to Fig. 2, will be moved toward the front or rear, and, relative to Fig. 4, will be moved to the left or right so that a turning movement will be exerted on the frame 15 whereby the precession of the gyroscope 11 will be made retrogressive.

Figure 4:
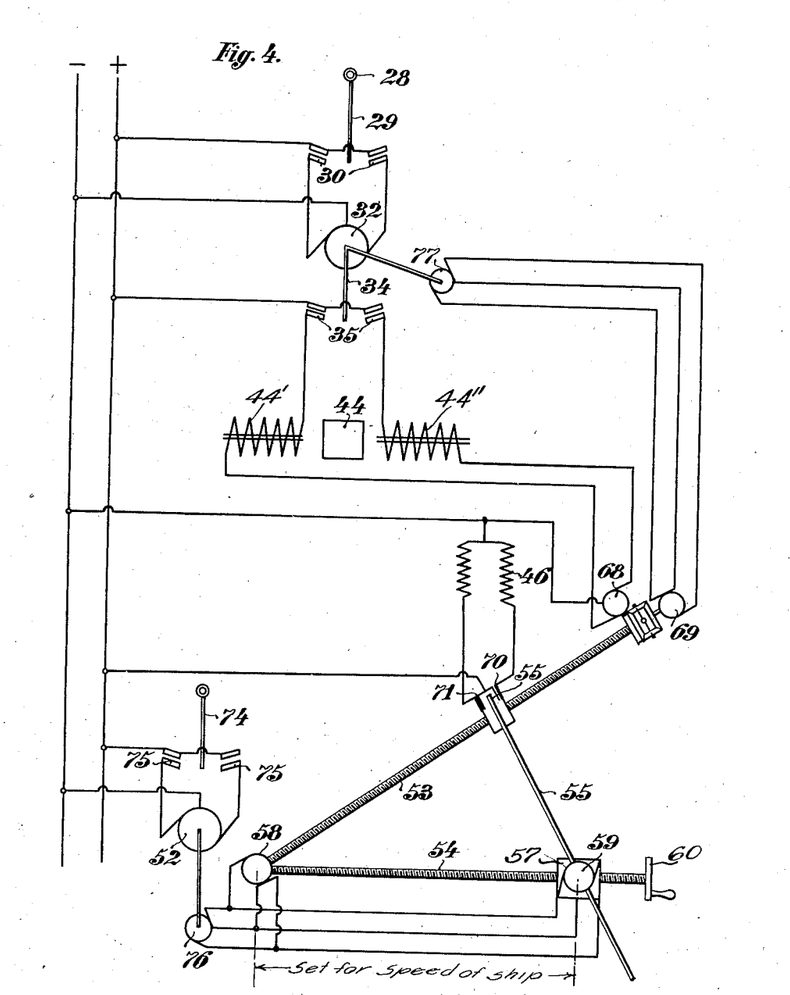
Fig. 4 is a wiring diagram in simplified form.

An electric rotary magnet 45 and 46 is connected with the vertical precession axis 28 of the gyroscope 11, which may also be constructed in a manner similar to the magnet 38 and 39 of Figs. 5 and 6 and which, as will be more fully described in connection with Fig. 4, is adapted to be connected and disconnected in and out of the circuit by means of a contact arrangement 55, 70 and 71.

For damping the oscillatory movement of the frame 15 there is provided a means comprising the toothed sector 47, the liquid container 48 with blades 49, and a pinion 50. The frame 16 horizontally rotatable is in its construction and form similar to the frame 15, but is suspended in the frame 14 with its plane vertical to that of the frame 15. The frame 17 of the azimuth gyroscope 13 is rotatably mounted in the frame 14 in a manner similar to the frames 15 and 16, with the exception that it is not suspended above its center of gravity, the gyroscope 13 possessing horizontal axes of precession and rotation with a vertical axis of sensitivity. The axis of sensitivity is that which is rectangular to the axes of precession and rotation. By stating the directions of the axes of precession and rotation to be horizontal, it is understood that the axis of sensitivity must be vertical.

The axis 20 of the frame 14 is provided with a gear wheel 51 meshing with the pinion of the reversing motor 52 mounted on the universal ring 18.

Figure 7:
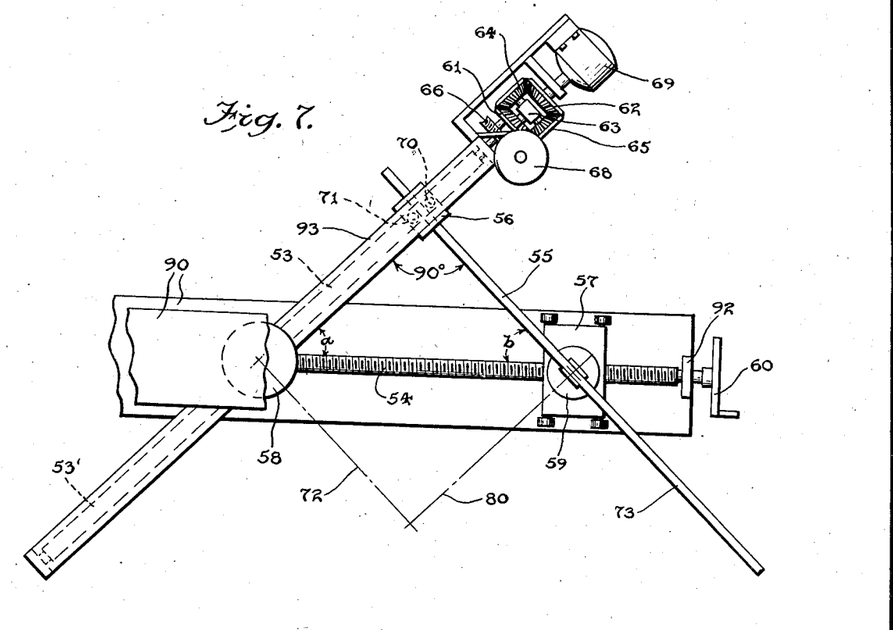
Fig. 7 is a plan view of the invention.
Figure 8:
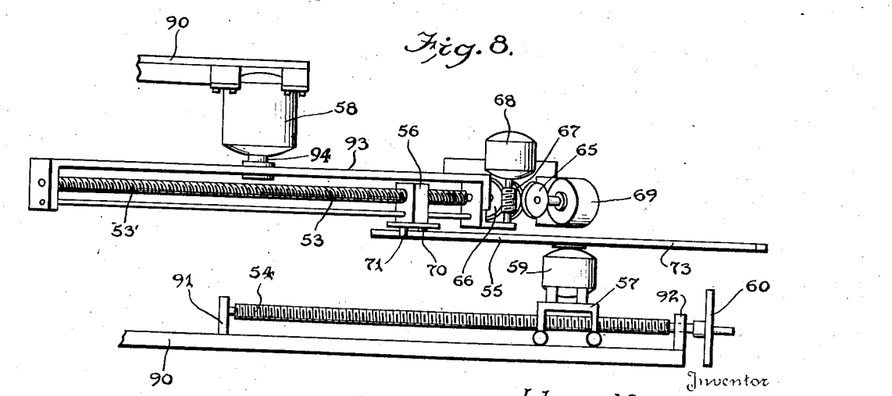
Fig. 8 is a side view thereof.

The receptive portion of the apparatus, or the setting device, as illustrated in Figs. 4, 7 and 8, comprises in substance the two spindles 53 and 54, one of which is capable of rotating relative to the other at their point of intersection, and further the contact rail 55, and the guide nuts 56 and 57. The angle α generated by the spindles is adjusted by an electric receiver 58, which is actuated by a transmitter 76 connected with the reversing motor 52. The same transmitter also actuates a second receiver 59 on the nut 57, which receiver runs synchronously with but in opposition to the receiver 58, and thus permits of adjustment or setting of the angle β as a complementary angle to α by rotation of the rail 55 about its point of intersection with the spindle 54. The receiver 59 may be moved together with the nut 57 along the spindle 54.

The receiver 58 is secured to the frame 90. The same frame which is shown only in part carries the bearings 91 and 92 in such a manner that the axis of the receiver 58 intersects the axis of spindle 54. Spindle 53 is journalled in a frame 93 which is carried by the armature shaft 94 of the receiver 58. Frame 93 carries furthermore the parts 61—69, i. e. the differential drive with receivers 68 and 69.

The receiver 59 is supported by a nut 57 of spindle 54 and carries the rail 55 which is capable of engaging the contacts 70 and 71 of nut 56. Rod 95 serves as a guide for nut 56.

Now assume the zero-position to be such that spindle 53 is parallel to 54, and consequently rail 55 rectangular to both 53 and 54. If then the corresponding transmitter turns receiver 58 in a counter-clockwise direction so that the angle between spindles 53 and 54 (see Figs. 4 or 7) is α then the same transmitter may turn receiver 59 for the same angle in such a manner that the angle between rail 55 and spindle 54 is β=90°−α.

This movement is caused by the device 60 at the free end of the spindle 54. The device 60 consists, for example, of a crank, a hand-wheel or the like in the case of adjustment by hand, or of a motive-power receiver, and serves the purpose of setting the speed of a ship, or the ground speed respectively, which is determined in any suitable independent means (for example, by a speedometer), by displacement of the nut 57. When employing the apparatus there will accordingly be measured on each occasion the distance from the point of intersection of the spindles 53, 54 to the point of intersection of the spindle 54 with the contact rail 55 in proportion to the speed of the ship. The spindle 53 is extended beyond rail 55 while said rail is also extended beyond nut 57, as at 73.

The spindle 53 possesses at its free end a differential gear, consisting, for example, of the bevel wheels 61 and 62, and the planet bevel wheels 64 and 65, which are rotatable around the common axis 63. The wheel 61 is rotatable in common with the worm wheel 66 on the end of the spindle 53, and is operated by the receiver 68 through the medium of the worm 67. The bevel wheel 62 is coupled with the receiver 69, and the axis 63 of the planet wheels 64, 65 with the spindle 53. The displacement of the nut 56 accordingly occurs under the differential action exerted by the receivers 68 and 69. In this manner, as will be described, there is adjusted a component of the ship's speed provided by the gyroscopic apparatus, viz., with the assistance of one of the gyroscopes 11 or 12.

As will be seen in Fig. 4 the forward end of the rail 55 carries the contact 71 between two counter-contacts 70 which is carried by the nut 56. The contact 71 is in circuit with one pole of the source of current while one of the two contacts 70 connected to one-half of the coil of the electro-magnet 46 (Figs. 2 and 4) and the other contact connected to the other half of the coil of the electro-magnet 46 are connected with the second pole of the source of current. The two halves of the coils of the electro-magnet 46 are so connected that when one coil is energized the armature 45 will be turned clockwise and when the other coil is energized the armature 45 will be rotated counter-clockwise.

If now under the action of the different influences determining the triangle 53, 54 and 55 the nut 56 moves away from its middle position to the rail 55, the latter upon moving over the surface of the nut 56 touches one of the two contacts 70, 71 disposed laterally relative to its middle position.

The members 53, 54 and 55 are so connected to each other that, relative to Fig. 4, upon movement of the spindle 53 around the intersection point of the spindles 53 and 54, the spindle 53 will be brought into such a position that it will lie under the spindle 54.

The operation of the apparatus is as follows (see more particularly Fig. 4):

The nut 57, which is mounted on a spindle 54 in stationary bearings 91 and 92, is shifted by the hand crank 60 in such a way that the distance between the point of intersection of the spindles 54 and 53 and this nut 57 corresponds to the speed of the ship as measured by a distance indicator or the like. This true ship's speed will now be compared with the resultant from the right-angular components of the apparent speed ascertained from the gyroscope apparatus of Fig. 1 in the north-south direction and the east-west direction.

Figure 1:
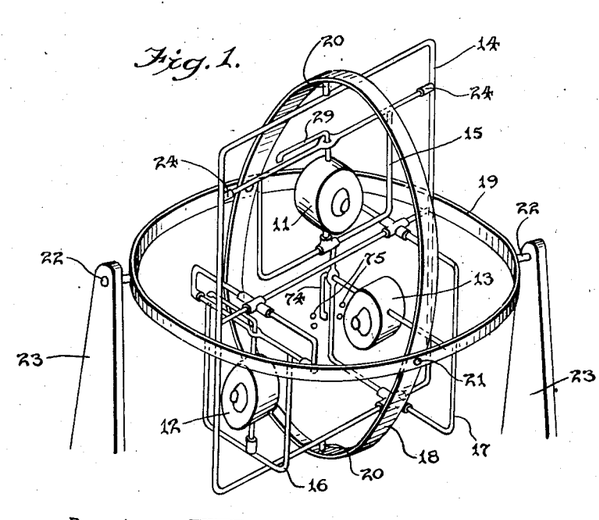
Fig. 1 is a perspective view of the gyroscopic apparatus.

The cardanically suspended system of Fig. 1 is maintained in the north-south direction by the azimuth gyroscope 13, so that the plane of the frame 14 carrying all three gyroscopes will lie vertically relative to the north-south direction. The azimuth gyroscope 13 is not capable of holding the frame in its position by its own inertia on turning of the ship. As a matter of fact, the frame 14 upon the turning of the ship will be moved more or less out of its position due to the friction of the pin 20. This results in that the azimuth gyroscope 13, which is susceptible of rotation around the axis of the pins 20, precesses. The contact arm 74 arranged on the precession axis of this gyroscope operates according to Fig. 4 together with counter-contacts 75, which are securely fastened to the frame 17 (Fig. 1). However, according to the precession direction of the azimuth gyroscope 13, the follow-up motor 52 (Fig. 4) will be set into rotation in one or the other direction so that this motor will rotate the frame 14 backwardly relative to the vertically arranged ring 18 and thereby the precession of the gyroscope 13 will be retrograded. By the cooperation of the gyroscope 13 with the affected follow-up motor 52, for example at the lower end of pin 20, the plane of the frame 14 will be maintained vertical in the north-south direction. The movement of the motor 52 will be transferred from a transmitter 76 (Fig. 4) to the electrical receivers 58 and 59. These two oppositely-rotating receivers 58 and 59 swing the spindle 53 and the contact track 55 relative to the stationary spindle 54 around the angle α and β—that is, corresponding to the position of the north-south direction and the east-west direction relative to the direction of the pins or axes 22 (Fig. 1). Hereby the direction 22—22 is in the direction of the travel of the ship.

In the apparatus according to Fig. 4, the directions of the north-south and east-west components determine the apparent direction of the travel of the ship. In the same way as the arrangement of Fig. 1, the rotary axis of the first horizontal gyroscope 11 is regulated in the north-south direction and the rotary axis of the second horizontal gyroscope 12 is regulated in the east-west direction. It is now to be explained in what manner the nut 56 is set on the spindle 53 in order to determine the distance in the north-south direction. The components of the distance in the north-south direction are determined from the precession movements of the gyroscope 11. This gyroscope 11 with its frame 15 is suspended in the main frame 14 in the manner of a pendulum by means of the pins 24 (Fig. 2). This pendulum is subject to the influence of the force of gravity and further the influence of the accelerations occurring in the north-south direction. If one assumes that the frame 15 of the pendulum hangs exactly vertically, then the pendulum, whenever the speed of the ship increases or diminishes in the north-south direction, is subject to a corresponding couple. These couples do not bring the pendulum consisting of the gyroscope 11 and the frame 15 out of the vertical position by their own action. They merely produce a precessional displacement of the freely precessing gyroscope 11. It is evident, therefore, that the total precession of the gyroscope 11 corresponds to the resultant of all the acceleration couples acting upon the pendulum consisting of the gyroscope 11 and the frame 15. Therefore, the total precession of the gyroscope 11 is a measure of the resultant of all the accelerations in the north-south direction and thus a measure for the components of the speed of travel in the north-south direction. Therefore, nothing more would be necessary than to indicate the precession angle of the arm 29 arranged on the precession axis of the gyroscope 11, on the spindle 53 (Fig. 4), as a distance. In quite similar manner, the precessional angle of the east-west gyroscope 12 should be represented as a distance on the contact bar 55 (Fig. 4), since the east-west gyroscope 12 displaced relatively to the gyroscope 11 by 90° measures the resultant of all the accelerating couples which are produced by the accelerations in the east-west direction.

As regards the gyroscope 11, the transmission of its precessional movements to the apparatus shown in Fig. 4 takes place in the following manner. As soon as the gyroscope 11 and therefore its contact arm 29 are deflected by a definite amount which can be kept as small as desired, on acceleration in the north-south direction, the motor 32, according to Figs. 2 and 4, is started in one or the other direction of rotation so that it causes the counter-contacts 30 to follow the contact arm 29 and in this manner the electrical transmitter 77 coupled thereto to shift corresponding to the precessional displacement of the arm 29. The receiver 69 associated with the transmitter 77 now rotates the spindle through the differential gearing in such a direction that the nut 56 is journaled corresponding to the precessional displacement of the contact arm 29. Keeping in mind that the apparatus comes into operation when the ship begins its travel with the course angle α relatively to the north-south direction, then in the course of time the contact arm 29 becomes deflected corresponding to the total acceleration of the ship in the north-south direction and therefore also the nut 56 is displaced from the point of intersection of the spindles 53, 54 corresponding to this total acceleration, that is, corresponding to the components of velocity in the north-south direction. Simultaneously, the nut 59 had to be displaced by hand through the crank 60, with increasing speed, more and more towards the right. The apparatus may be put into operation during the travel of the ship. Then the nut 59 is shifted so far on the spindle 54 until its distance from the point of intersection of the spindle 54 with the spindle 53 corresponds to the rate of speed of the ship which is provided with a speed indicator; the nut 56 would then be adjusted by hand a certain amount. After this, however the further adjustment of the nut 59 would take place automatically by the receiver 69 when accelerations or retardations of the travel in the north-south direction occur.

It will be seen that with this simple procedure, the precessional displacement of the gyroscope would soon become impermissibly large. For an exact measurement it is absolutely necessary that the rotational axis of the gyroscope 11 should depart but little from the north-south direction. In order to achieve the result that the sum of all the precession angles of the gyroscope 11 will be transmitted to the nut 56 of the spindle 53 without the gyroscope having an impermissibly large precession, the precession of the gyroscope is always made retrogressive when it reaches a certain magnitude. This is effected by means of the balance weight 44 (Figs. 2 and 4). If the gyroscope 11 precesses more than 6° for example, then the spring contact 34—35 is closed, the contact 34 being shifted as known by the follow-up motor 32. As shown in Fig. 4, the spring contact 34—35 switches in one or the other of the electro-magnets 44', 44'', which shifts the weight 44 (Fig. 2) a certain extent out of its mid-position, so that a couple is exerted on the pendulum consisting of the gyroscope 11 and the frame 15, said couple acting in the direction to cause the precession of the gyroscope 11 to diminish. The electro-magnet 44' or 44'' pulls the weight 44, for example, against the action of a spring, suddenly out of its zero position. The couple produced by this weight 44 then operates transiently and produces a somewhat abrupt return of the gyroscope 11 to its zero position. It is only the instant in which the gyroscope and thus also the contact 34 return to the zero position that interruption of contact between 34 and 35 takes place, as previously described. Only at this instant, therefore, does the weight 44 return to its zero position, for example by the action of its restraining spring. During the interval in which the electro-magnet 44' or 44'' is energized and had thus displaced the weight 44 from its mid-position, the small motor 68 (Fig. 4) was connected to the source of current over the contact devices 34, 35. This motor thus transmits the reverse precession of the gyroscope 11 to the spindle 53. It must be observed that due to the reverse precession of the gyroscope 11, obviously the motor 32 (Figs. 2 and 4) will shift the transmitter 77 and the receiver 69. In practice, the conditions are such that the gyroscope 11 as a result of accelerations occurring in the north-south direction will gradually precess up to an angle of 6° to one side or the other whereby the receiver 69 (Fig. 4) slowly displaces the spindle nut 56. As soon as the precessional displacement exceeds 6°, the angle of precession, in a very brief interval, will diminish due to the shifting of the weight 44 and the receiver 69 will obviously return to its initial position, the receiver 68, however, compensating the reverse rotation of the receiver 69, so that in this quite brief interval the position of the nut 56 remains unchanged. The operation then takes place anew, that is, the nut 56 is again merely displaced by the receiver 69 as long as the angle of precession of the gyroscope 11 does not exceed an angle of 6°.

It will be seen that when course alterations of the ship takes place, the motor 52 is switched in by the gyroscope 13 and the remote control system associated with this motor 52 will vary the position of the spindle 53 and the contact bar 55 relatively to the spindle 54, corresponding to the turning north-south direction and the east-west direction relatively to the direction of the longitudinal axis of the ship, or direction of travel.

It will be seen that the precessional movements of the gyroscope 11 and also of the gyroscope 12 correspond exactly to the resultant of all the accelerations occurring in the north-south and in the east-west directions, when the pendulum consisting of the gyroscope 11 and the frame 15, and the pendulum consisting of the gyroscope 12 and the frame 16, hang exactly vertically, because gravity can then exert no couple on the pendulum. When, however, for any reason, the frame 15 or the frame 16 does not hang exactly vertically, then gravity exerts a couple on the frame which produces an additional precession of the gyroscope 11 or the gyroscope 12. This additional precession renders the readings of the previously described measurement erroneous—that is, in the comparison apparatus according to Fig. 4 the spindle 55 will receive an additional error introducing displacement such that the resultant of the components of speed in the north-south and east-west directions no longer agrees with the speed directly measured and adjusted on the spindle 54. Therefore, the contact bar 55 no longer is inclined at the correct angle to the spindle 53, but this bar 55 will make contact with either the contact 70 or the contact 71. This causes one or the other of the windings of the correcting magnet 46 to be energized. This correction magnet then attracts its armature 45 (Fig. 2) whereupon the gyroscope 11 exerts a couple on the pendulum frame 15 in the direction for returning this frame 15 into its vertical position. The essence of the invention thus consists in that by comparison of the speed components produced by the gyroscopes 11 and 12 with the otherwise measured speed adjusted on the spindle 54, conclusions can be made as to whether the pendulum frames 15 and 16 (Fig. 1) are vertical, or the rotational axes of the gyroscopes 11, 12 are horizontal. It is only when the system according to Fig. 1 is not exactly horizontal that there occurs in the comparison apparatus according to Fig. 4 energizing of the correction magnet 46 which restores the pendulum to the plumb or vertical position.

The apparatus according to Fig. 4 suffices only with rough approximation for the comparison, because in this apparatus merely component of velocity occurring in the north-south direction is adjusted, while the component occurring in the east-west direction is self-adjusted or set as a distance between the nuts 56 and 59. For an exact comparison, this distance of the nuts 56 and 59 should be adjusted by apparatus controlled by the east-west gyroscope 12. The arrangement and mode of operation of the east-west gyroscope and the parts cooperating therewith may be the same as in the case of the north-south gyroscope 11.

If in a second measurement the difference between the true speed adjusted by the hand crank 60 and the resultant of the measured components of the north-south and east-west speeds is equal to that obtained by the first measurement, then the gyroscopes 11 and 12 will indicate the true horizon by means of their rotational axes. Otherwise, care must be applied until two or more measurements give similar differences. Obviously it is also possible to operate continuously, by shifting the spindle nut 59 continuously corresponding to the readings of a travel indicator or ship's log and applying automatically continuous corrections whereby the horizon remains constantly in its position.

Instead of the angle between the spindle 53 and the rail 55 remaining, with the assistance of the two receivers 58 and 59, exactly constant at 90°, and contact taking place when the center of the nut 56 moves against the rail 55, the receiver 59 may be omitted. The rail 55 is then furnished with a fixed point of rotation on the nut 57, and the nut 56 is provided with a rotary head, in which the rail 55 may be displaced longitudinally with the rotation of the said head. The contacts 70 and 71 are so arranged that one is closed when the angle between the spindle 53 and the rail 55 departs from 90°.

It is also possible to employ an additional arrangement, Figs. 7 and 8, of the type known per se for compensating rolling movements when setting off the actual speed on the spindle 54, for example in such fashion that the part of the nut 57 carrying the rail 55 is arranged so as to be transversely displaceable in relation to the spindle 54, and is controlled by a transmitter excited by the rolling movement in accordance with the rate thereof and the distance of the axis of the same.

A similar device consisting of the parts 53—73 is provided for setting the second speed component of one of the gyroscopes 11 or 12. The two similar apparatus may also be connected, so that only one spindle 54 is required. It is also possible to allow the spindle for the second component, which spindle is provided in a vertical position to the spindle 53 on the nut 56 of the first one, to be moved by the latter. In this connection it is to be remembered that the only point concerned is the comparison between the speed of the ship as correctly determined in independent fashion by a measuring apparatus and the apparent speed determined from the components of the gyroscopes 11, 12, viz., according to degree and direction.

The invention is not limited to the form of embodiment shown, and numerous modifications are quite possible, both as regards the relative arrangement of the parts as well as their actuation. Thus, for example, a number of rectifying devices may be combined, and it is also possible to employ mechanical, hydraulic or pneumatic transmission in place of electrical transmission. The single gyroscopes are not required to be mounted in a common frame, but may be separately mounted. It is also possible to allow the gyroscope of any other apparatus to assume the function of one or more of the gyroscopes according to the invention.

The essence of the invention resides, generally speaking, in the apparatus for determining the true horizon by the fact that the precession arising from all causes is represented as speed, and in repeated measurement of the differences between the apparent speed and the true speed determined in other ways are employed for determining the true horizon either in manual or automatic operation. The apparatus is also not restricted in its use to the specific purpose as described, and has, inter alia, the object of producing by the connection of forces moments acting in opposition to moments of disturbance in a pre-stabilized gyroscopic apparatus.

What I claim as new and desire to secure by Letters Patent is:

1. A system for determining the true horizon on board a craft, comprising a three-gyro apparatus composed of an azimuth gyro and two horizon gyros having mutually-normal, horizontal spin axes; a setting apparatus including members representing an adjustable triangle; means controlled by one horizon gyro for adjusting a side of the triangle to represent the algebraic total of the increments of precession of said one gyro; means for adjusting a second side proportional to the true speed of the craft; means controlled by the azimuth gyro for adjusting the angle between said two members in accordance with the ship's heading; and means responsive to an incorrect angular position of the member representing the third side for rectifying the position of the horizon gyros to restore their spin axes to true horizontal.

2. In a system for determining the true horizon on board a craft, the combination of a three-gyro-apparatus composed of an azimuth gyro and two horizon gyros having mutually-normal, horizontal spin axes; a setting apparatus including members representing an adjustable triangle, one side of the triangle being adapted to be adjusted to represent the algebraic total of the increments of precession of said one horizon gyro and a second side being adapted to be adjusted proportional to the true speed of the craft; and means responsive to an incorrect angular position of the member representing the third side for rectifying the position of the horizon gyros to restore their spin axes to true horizontal.

3. A system for determining the true horizon on board a craft, comprising a three-gyro apparatus composed of an azimuth gyro and two horizon gyros having mutually-normal, horizontal spin axes; a setting apparatus including members representing an adjustable triangle; means controlled by one horizon gyro for adjusting a side of the triangle to represent the algebraic total of the increments of precession of said one gyro; means for adjusting a second side proportional to the true speed of the craft; means controlled by the azimuth gyro for adjusting the angle between said two members in accordance with the ship's heading; and a common frame within which said gyros are mounted, said frame being suspended universally above its center of gravity and provided with a vertical axis of rotation.

4. A system according to claim 1, in which the members of the setting apparatus are in the form of arms having variable effective lengths.

5. In a system for determining the true horizon on board a craft by means of a gyro apparatus with an azimuth gyro and two horizon gyros having mutually-normal, horizontal spin axes and with a transmitter adapted to be operated relative to the position of the azimuth gyro and with a transmitter operatively connected with the axis of precession of one of the two horizon gyros; a setting apparatus including arm members representing an adjustable triangle and comprising one arm member of variable length, a second arm member of variable length adapted to be angularly displaced in relation to the first arm member, a third arm member adapted to be angularly displaced in relation to the first arm member, a receiver adapted to be energized by the transmitter of the azimuth gyro and adapted to swivel the second arm member relative to the first arm, a second receiver adapted to be energized by the transmitter of the azimuth gyro and to swivel the third arm member relative to the first arm, a third receiver adapted to be energized by the transmitter of one of the horizon gyros, and to vary the effective length of the second arm member, and means for varying the effective length of the first arm member.

6. A setting apparatus for use in combination with an azimuth gyro and two horizon gyros including members representing an adjustable triangle to determine the true horizon on board a craft, comprising a first arm member of variable effective length; a second arm member of variable effective length adapted to be angularly displaced relative to the first arm member proportional to the position of the azimuth gyro; a third arm member slidable on the first arm member and cooperating with the second arm member; means for varying the effective length of the first arm member proportional to the true speed of the ship; and means for varying the length of the second arm member proportional to the sum of the precessions of one of the horizon gyros.

7. A setting apparatus for use in combination with an azimuth gyro and two horizon gyros including members representing an adjustable triangle to determine the true horizon on board a craft, comprising a first arm member of variable effective length; a second arm member of variable effective length adapted to be angularly displaced relative to the first arm member proportional to the position of the azimuth gyro relatively to the carrying craft; a third arm member slidable on the first arm member and cooperating with the second arm member; means for varying the effective length of the first arm member relative to the true speed of the ship; means for varying the length of the second arm member proportional to the sum of the precessions of one of the horizon gyros; and means adapted to become active to correct the position of said horizon gyros when the second and third arm members depart from a mutually normal position.

8. In a system for determining the true horizon on board a craft including a three-gyro-apparatus with an azimuth gyro and two horizon gyros having mutually-normal, horizontal spin axes, and a setting apparatus including members representing an adjustable triangle of which a member is adjustable by and proportional to the algebraic total of the increments of precession of one of the horizon gyros; the combination of means adapted to apply a moment to one horizon gyro for inducing retrograde precession thereof with means adapted to maintain fixed the adjustment of the adjustable member when and as long as the said retrograde precessional movement is taking place.

9. In a system for determining the true horizon on board a craft including a three-gyro-apparatus with an azimuth gyro and two horizon gyros having mutually-normal, horizontal spin axes, and a setting apparatus including members representing an adjustable triangle of which a member is adjustable by one horizon gyro to represent the algebraic total of the increments of precession of said one of the horizon gyros, the combination of means adapted to apply a moment to one horizon gyro for inducing retrograde precession thereof, with a differential drive for adjusting the adjustable member of the setting apparatus, said differential drive being provided with a driving member energized under the influence of the total of precession of one horizon gyro, and with a driving member energized when the said retrograde precessional movement is taking place to maintain constant the adjustment of said adjustable member during said retrograde precession.

10. A setting apparatus for use in combination with an azimuth gyro and two horizon gyros having mutually-normal, horizontal spin axes to determine the true horizon on board a craft, comprising a spindle rotatably mounted; a nut adapted to be axially displaced by rotation of said spindle; a second spindle rotatably mounted adjacent to said first spindle and adapted to be displaced angularly in relation to the first spindle; means for rotating the first spindle to displace the first nut proportional to the true speed of the craft; a second nut adapted to be axially displaced by rotation of the second spindle; means controlled by the azimuth gyro for adjusting the angle between said spindles proportional to the position of the azimuth gyro relatively to the craft; a rail pivoted on said first nut; means controlled by the azimuth gyro for adjusting the angle between said rail and the first spindle proportional to the complementary angle between the first and second spindle; means controlled by one horizon gyro for displacing the second nut proportional to the algebraic total of the increments of precession of said one of the horizon gyros; and means between the rail and the second nut adapted to close an electric circuit when the angle between the rail and the second spindle differs from a right angle to control a respective horizon gyro.

11. A setting apparatus for use in combination with an azimuth gyro and two horizon gyros having mutually-normal, horizontal spin axes to determine the true horizon on board a craft, comprising a spindle rotatably mounted; a nut adapted to be axially displaced by rotation of said spindle; a second spindle rotatably mounted adjacent said first spindle and adapted to be displaced angularly in relation to the first spindle; means for displacing the nut proportional to the true speed of the craft; a second nut on and adapted to be axially displaced by rotation of the second spindle; means controlled by said azimuth gyro for adjusting the angle between said spindles in correspondence with the position of the azimuth gyro relatively to the craft; a rail pivoted on said first nut; means for adjusting the angle between said rail and the first spindle proportional to the complement of the angle between the first and second spindle; a differential drive adapted to rotate the second spindle, said differential drive having a member driven by and in correspondence with the algebraic total of the increments of precession of one of the horizon gyros, and a second member adapted to be driven when a return moment is active on the horizon gyro tending to precess the same to normal position; and means between the rail and the second nut adapted to close an electric circuit when the angle between the rail and the second spindle differs from a right angle.

JOHANN MARIA BOYKOW.